US012646712B2

(12) United States Patent
Han et al.

(10) Patent No.: US 12,646,712 B2
(45) Date of Patent: *Jun. 2, 2026

(54) POSITIVE ELECTRODE ACTIVE MATERIAL FOR SECONDARY BATTERY, METHOD FOR PREPARING THE SAME AND LITHIUM SECONDARY BATTERY COMPRISING THE SAME

(71) Applicant: LG Energy Solution, Ltd., Seoul (KR)

(72) Inventors: Gi Beom Han, Daejeon (KR); Sang Min Park, Daejeon (KR); Ji Hye Kim, Daejeon (KR); Tae Gu Yoo, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,050

(22) Filed: May 29, 2024

(65) Prior Publication Data

US 2024/0313210 A1      Sep. 19, 2024

Related U.S. Application Data

(63) Continuation of application No. 16/657,275, filed on Oct. 18, 2019, now Pat. No. 12,040,484.

(30) Foreign Application Priority Data

Oct. 26, 2018      (KR) ........................ 10-2018-0129162

(51) Int. Cl.
H01M 4/505 (2010.01)
H01M 4/02 (2006.01)
(Continued)

(52) U.S. Cl.
CPC ......... H01M 4/505 (2013.01); H01M 4/0471 (2013.01); H01M 4/366 (2013.01);
(Continued)

(58) Field of Classification Search
CPC .............................. H01M 4/505; H01M 4/525
See application file for complete search history.

(56) References Cited

U.S. PATENT DOCUMENTS

2005/0079416 A1* 4/2005 Ohzuku ................ H01M 4/485
                                                              423/594.2
2009/0117453 A1    5/2009 Kikuchi et al.
(Continued)

FOREIGN PATENT DOCUMENTS

JP        2005025975 A      1/2005
JP        2018092715 A      6/2018
(Continued)

OTHER PUBLICATIONS

Jae-Hyun Shim et al., "Effects of heat-treatment atmosphere on electrochemical performances of Ni-rich mixed-metal oxide (Li Ni0.80Co0.15Mn0.0502) as a cathode material for lithium ion battery", Electrochimica Acta, 138 ( Aug. 2014), pp. 15-21.
(Continued)

*Primary Examiner* — Robert S Carrico
(74) *Attorney, Agent, or Firm* — Lerner David LLP

(57)      ABSTRACT

A positive electrode active material for a secondary battery is provided, which includes a lithium composite transition metal oxide including nickel (Ni), cobalt (Co), and manganese (Mn), wherein a particle of the lithium composite transition metal oxide includes a core portion and a resistance portion formed on a surface of the core portion, and is composed of a single particle, wherein the core portion has a layered crystal structure of space group R-3m, and the resistance portion has a cubic rock-salt structure of space group Fm-3m.

8 Claims, 14 Drawing Sheets

E.G. 1

(51) Int. Cl.
  *H01M 4/04*      (2006.01)
  *H01M 4/36*      (2006.01)
  *H01M 4/525*      (2010.01)
  *H01M 10/0525*      (2010.01)

(52) U.S. Cl.
  CPC ....... *H01M 4/525* (2013.01); *H01M 10/0525* (2013.01); *H01M 2004/028* (2013.01)

(56) References Cited

U.S. PATENT DOCUMENTS

| | | |
|---|---|---|
| 2010/0159325 A1 | 6/2010 | Sugiura et al. |
| 2015/0017532 A1 | 1/2015 | Iguchi et al. |
| 2015/0280211 A1 | 10/2015 | Kikuya et al. |
| 2016/0181611 A1 | 6/2016 | Cho et al. |
| 2018/0145368 A1 | 5/2018 | Ochiai et al. |
| 2019/0044118 A1 | 2/2019 | Sakurai et al. |

FOREIGN PATENT DOCUMENTS

| | | |
|---|---|---|
| KR | 20160074236 A | 6/2016 |
| WO | 2010074313 A1 | 7/2010 |

OTHER PUBLICATIONS

Masoumi, M. "Thermochemical and electrochemical investigations of Li(Ni,Mn,Co)O2 (NMC) as positive electrode material for lithium-ion batteries" Germany, Dec. 2019, pp. 1-226.

* cited by examiner

E.G. 1

Comp E.G. 1 ==> Both LAYERED

E.G. 4 ==> Core Layered, Surface Rock-salt

Comp E.G. 3 ==> Both LAYERED

POSITIVE ELECTRODE ACTIVE MATERIAL FOR SECONDARY BATTERY, METHOD FOR PREPARING THE SAME AND LITHIUM SECONDARY BATTERY COMPRISING THE SAME

CROSS-REFERENCE TO RELATED APPLICATIONS

The present application is a continuation of U.S. patent application Ser. No. 16/657,275, filed on Oct. 18, 2019, which claims priority from Korean Patent Application No. 10-2018-0129162, filed on Oct. 26, 2018, all of which are incorporated herein by reference.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Among these materials, since the lithium cobalt oxide ($LiCoO_2$) is advantageous in that its operating voltage is high and capacity characteristics are excellent, the lithium cobalt oxide ($LiCoO_2$) has been widely used and has been used as a positive electrode active material for high voltage. However, since there is a limitation in using a large amount of the $LiCoO_2$ as a power source for applications, such as electric vehicles, due to the rising price and unstable supply of cobalt (Co), there emerges a need to develop a positive electrode active material capable of replacing the $LiCoO_2$.

Accordingly, a nickel cobalt manganese-based lithium composite transition metal oxide (hereinafter, simply referred to as 'NCM-based lithium composite transition metal oxide'), in which a portion of cobalt (Co) is substituted with nickel (Ni) and manganese (Mn), has been developed. However, since a conventional NCM-based lithium composite transition metal oxide is generally in the form of a secondary particle in which primary particles are aggregated, its specific surface area is large, particle strength is low, and an amount of lithium by-product is large, and thus, there is a limitation in that an amount of gas generated during cell operation is large and stability is poor. Particularly, with respect to a high-Ni NCM-based lithium composite transition metal oxide in which an amount of nickel (Ni) is increased to secure high capacity, structural and chemical stabilities are further reduced, and it is more difficult to secure thermal stability.

PRIOR ART DOCUMENT

Patent Document (Patent Document 1) Korean Patent Application Laid-open Publication No. 2016-0074236

DISCLOSURE OF THE INVENTION

Technical Problem

An aspect of the present invention provides an NCM-based lithium composite transition metal oxide positive electrode active material having improved stability. Specifically, the present invention aims at providing an NCM-based lithium composite transition metal oxide positive electrode active material in which particle breakage during rolling is suppressed by decreasing a specific surface area and improving particle strength, and an increase in resistance is suppressed and a side reaction with an electrolyte solution is reduced by decreasing an amount of lithium by-product. Also, the present invention aims at providing an NCM-based lithium composite transition metal oxide positive electrode active material in which an amount of gas generated during cell operation may be reduced and thermal stability is secured.

Technical Solution

According to an aspect of the present invention, there is provided a method of preparing a positive electrode active material for a secondary battery which includes: preparing a positive electrode active material precursor including nickel (Ni), cobalt (Co), and manganese (Mn) in which an amount of the nickel (Ni) in a total amount of metals is less than 60 mol %; mixing the positive electrode active material precursor and a lithium raw material, and performing primary sintering on the mixture at a sintering temperature of 980° C. or more to form a primary sintered product; and performing secondary sintering on the primary sintered product at a sintering temperature of 900° C. or less to form a lithium composite transition metal oxide, wherein a particle of the lithium composite transition metal oxide is composed of a single particle and includes a core portion having a layered crystal structure of space group R-3m; and a resistance portion which is formed on a surface of the core portion and has a cubic rock-salt structure of space group Fm-3m.

According to another aspect of the present invention, there is provided a method of preparing a positive electrode active material for a secondary battery which includes: preparing a positive electrode active material precursor including nickel (Ni), cobalt (Co), and manganese (Mn) in which an amount of the nickel (Ni) in a total amount of metals is 60 mol % or more; mixing the positive electrode active material precursor and a lithium raw material, and performing primary sintering on the mixture at a sintering temperature of 850° C. or more to form a primary sintered product; and performing secondary sintering on the primary sintered product at a sintering temperature of 800° C. or less to form a lithium composite transition metal oxide, wherein a particle of the lithium composite transition metal oxide is composed of single particles and includes a core portion having a layered crystal structure of space group R-3m; and a resistance portion which is formed on a surface of the core portion and has a cubic rock-salt structure of space group Fm-3m.

According to another aspect of the present invention, there is provided a positive electrode active material for a secondary battery which includes a lithium composite transition metal oxide including nickel (Ni), cobalt (Co), and manganese (Mn), wherein a particle of the lithium composite transition metal oxide includes a core portion and a resistance portion formed on a surface of the core portion and is composed of a single particle, wherein the core portion has a layered crystal structure of space group R-3m, and the resistance portion has a cubic rock-salt structure of space group Fm-3m.

According to another aspect of the present invention, there is provided a positive electrode and a lithium secondary battery which include the positive electrode active material.

Advantageous Effects

According to the present invention, a side reaction with an electrolyte solution may be reduced by decreasing a specific surface area of an NCM-based positive electrode active material, improving particle strength, and decreasing an amount of lithium by-product. Thus, with respect to a lithium secondary battery using the NCM-based positive electrode active material of the present invention, an amount of gas generated during cell operation may be reduced, an increase in resistance may be suppressed, and thermal stability may be secured. Since the NCM-based positive electrode active material of the present invention may secure excellent stability, it may be used in a high-voltage lithium secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
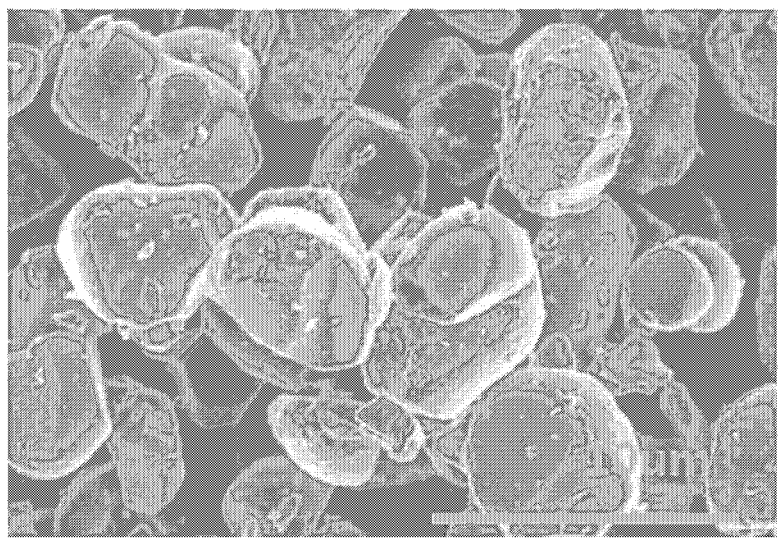
FIG. 1 is a magnified scanning electron microscope (SEM) image of a positive electrode active material prepared in Example 1.
Figure 2:
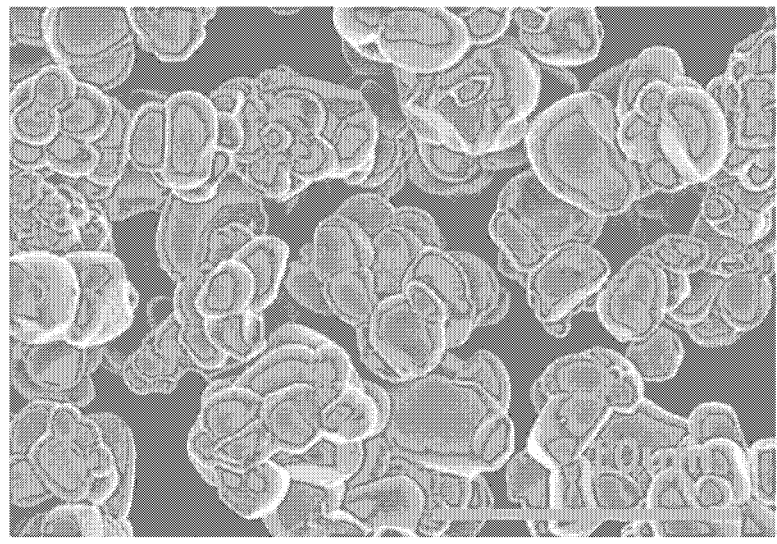
FIG. 2 is a magnified scanning electron microscope (SEM) image of a positive electrode active material prepared in Example 2.
Figure 3:
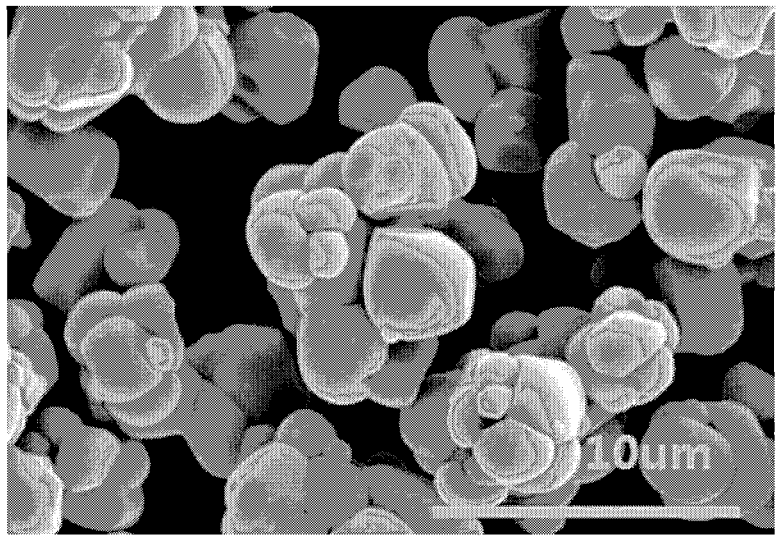
FIG. 3 is a magnified scanning electron microscope (SEM) image of a positive electrode active material prepared in Example 3.
Figure 4:
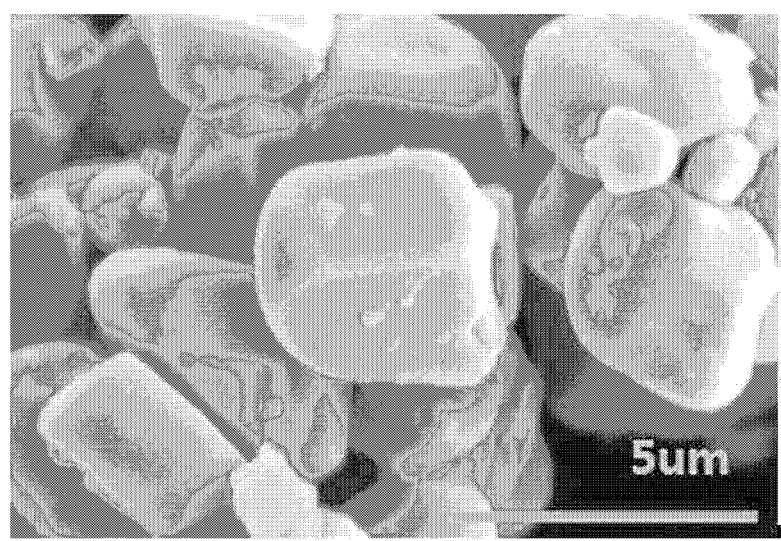
FIG. 4 is a magnified scanning electron microscope (SEM) image of a positive electrode active material prepared in Example 4.
Figure 5:
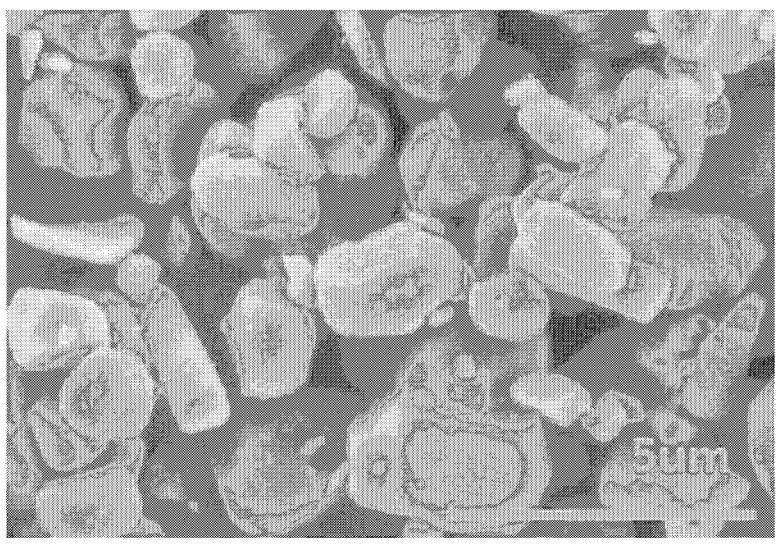
FIG. 5 is a magnified scanning electron microscope (SEM) image of a positive electrode active material prepared in Example 5.
Figure 6:
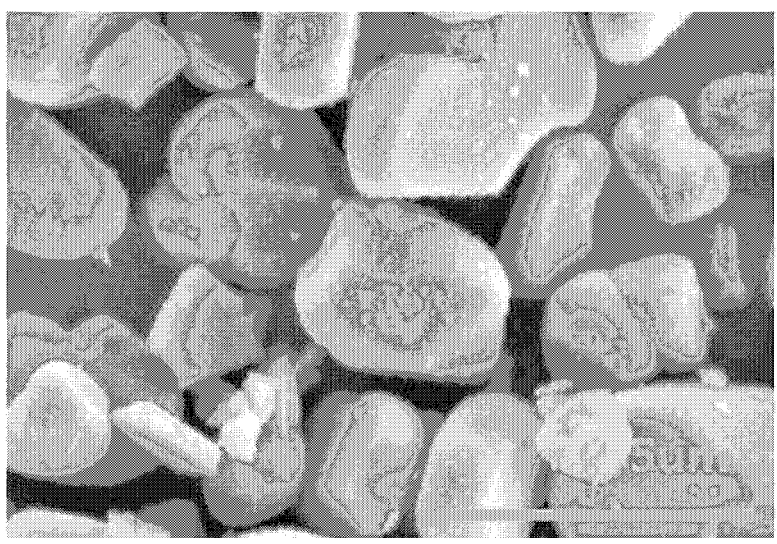
FIG. 6 is a magnified scanning electron microscope (SEM) image of a positive electrode active material prepared in Example 6.
Figure 7:
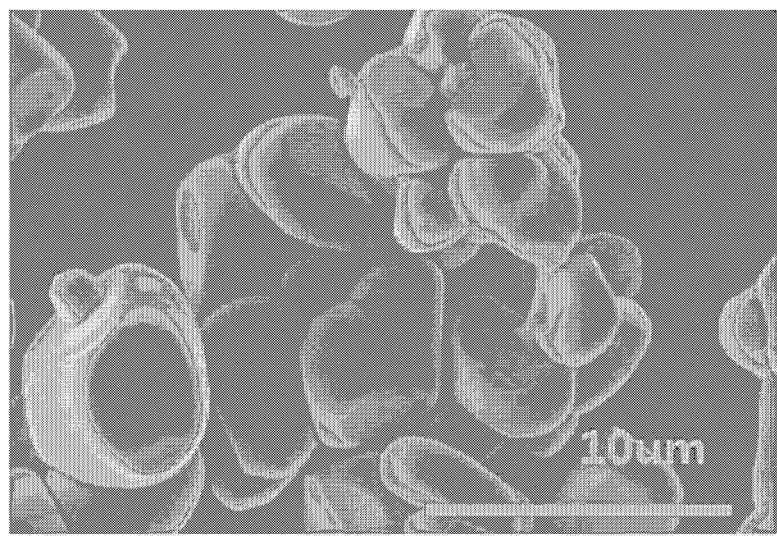
FIG. 7 is a magnified scanning electron microscope (SEM) image of a positive electrode active material prepared in Comparative Example 1.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Method of Preparing Positive Electrode Active Material

A positive electrode active material of the present invention is prepared by including the steps of: preparing a positive electrode active material precursor including nickel (Ni), cobalt (Co), and manganese (Mn) in which an amount of the nickel (Ni) in a total amount of metals is less than 60 mol %; mixing the positive electrode active material precursor and a lithium raw material, and performing primary sintering on the mixture at a sintering temperature of 980° C. or more to form a primary sintered product; and performing secondary sintering on the primary sintered product at a sintering temperature of 900° C. or less to form a lithium composite transition metal oxide, wherein a particle of the lithium composite transition metal oxide is composed of a single particle and includes a core portion having a layered crystal structure of space group R-3m; and a resistance portion which is formed on a surface of the core portion and has a cubic rock-salt structure of space group Fm-3m.

Also, the positive electrode active material of the present invention is prepared by including the steps of: preparing a positive electrode active material precursor including nickel (Ni), cobalt (Co), and manganese (Mn) in which an amount of the nickel (Ni) in a total amount of metals is 60 mol % or more; mixing the positive electrode active material precursor and a lithium raw material, and performing primary sintering on the mixture at a sintering temperature of 850° C.

or more to form a primary sintered product; and performing secondary sintering on the primary sintered product at a sintering temperature of 800° C. or less to form a lithium composite transition metal oxide, wherein a particle of the lithium composite transition metal oxide is composed of single particles and includes a core portion having a layered crystal structure of space group R-3m; and a resistance portion which is formed on a surface of the core portion and has a cubic rock-salt structure of space group Fm-3m.

A method of preparing the positive electrode active material will be described in detail for each step.

First, a positive electrode active material precursor including nickel (Ni), cobalt (Co), and manganese (Mn) is prepared.

The positive electrode active material precursor may be used by purchasing a commercially available positive electrode active material precursor, or may be prepared according to a method of preparing a positive electrode active material precursor which is well known in the art.

For example, the precursor may be prepared by a co-precipitation reaction by adding an ammonium cation-containing complexing agent and a basic compound to a transition metal solution including a nickel-containing raw material, a cobalt-containing raw material, and a manganese-containing raw material.

The nickel-containing raw material, for example, may include nickel-containing acetic acid salts, nitrates, sulfates, halides, sulfides, hydroxides, oxides, or oxyhydroxides, and may specifically include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt-containing raw material may include cobalt-containing acetic acid salts, nitrates, sulfates, halides, sulfides, hydroxides, oxides, or oxyhydroxides, and may specifically include $Co(OH)_2$, $CoOOH$, $Co(OCOCH_3)_2 \cdot 4H_2O$, $Co(NO_3)_2 \cdot 6H_2O$, $Co(SO_4)_2$, $Co(SO_4)_2 \cdot 7H_2O$, or a combination thereof, but the present invention is not limited thereto.

The manganese-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal solution may be prepared by adding the nickel-containing raw material, the cobalt-containing raw material, and the manganese-containing raw material to a solvent, specifically water, or a mixture of water and an organic solvent (e.g., alcohol etc.) which may be uniformly mixed with the water, or may be prepared by mixing an aqueous solution of the nickel-containing raw material, an aqueous solution of the cobalt-containing raw material, and the manganese-containing raw material.

The ammonium cation-containing complexing agent, for example, may include $NH_4OH$, $(NH_4)_2SO_4$, $NH_4NO_3$, $NH_4Cl$, $CH_3COONH_4$, $NH_4CO_3$, or a combination thereof, but the present invention is not limited thereto. The ammonium cation-containing complexing agent may be used in the form of an aqueous solution, and, in this case, water or a mixture of water and an organic solvent (specifically, alcohol etc.), which may be uniformly mixed with the water, may be used as a solvent.

The basic compound may include a hydroxide of alkali metal or alkaline earth metal, such as $NaOH$, $KOH$, or $Ca(OH)_2$, a hydrate thereof, or a combination thereof. The basic compound may also be used in the form of an aqueous solution, and, in this case, water or a mixture of water and an organic solvent (specifically, alcohol etc.), which may be uniformly mixed with the water, may be used as a solvent.

The basic compound is added to adjust a pH of a reaction solution, wherein the basic compound may be added in an amount such that the pH of the metal solution is 11 to 13.

The co-precipitation reaction may be performed in a temperature range of 40° C. to 70° C. in an inert atmosphere such as nitrogen or argon.

Particles of a nickel-cobalt-manganese hydroxide are formed by the above-described process, and are precipitated in the reaction solution. Concentrations of the nickel-containing raw material, the cobalt-containing raw material, and the manganese-containing raw material may be adjusted to prepare a precursor in which the amount of the nickel (Ni) in the total amount of metals is 60 mol % or more or to prepare a precursor in which the amount of the nickel (Ni) in the total amount of metals is less than 60 mol %. The precipitated nickel-cobalt-manganese hydroxide particles may be separated according to a conventional method and dried to prepare a nickel-cobalt-manganese precursor. The precursor may be a secondary particle which is formed by aggregation of primary particles.

Next, the positive electrode active material precursor and a lithium raw material are mixed and primarily sintered at an over-sintering temperature of a specific temperature or more to form a primary sintered product. In a case in which the amount of the nickel (Ni) in the total amount of metals of the positive electrode active material precursor is less than 60 mol %, the mixture is primarily sintered at a sintering temperature of 980° C. or more to form a primary sintered product. Also, in a case in which the amount of the nickel (Ni) in the total amount of metals of the positive electrode active material precursor is 60 mol % or more, the mixture is primarily sintered at a sintering temperature of 850° C. or more to form a primary sintered product.

As the lithium raw material, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium raw material may include $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

In the case that the amount of the nickel (Ni) is less than 60 mol %, the primary sintering temperature may be 980° C. or more, preferably 990° C. to 1,050° C., and more preferably 1,000° C. to 1,030° C. The primary sintering may be performed for 5 hours to 20 hours, preferably 5 hours to 15 hours, and more preferably 5 hours to 12 hours. The primary sintering may be performed in an oxygen atmosphere or an air atmosphere, and may more preferably be performed in an oxygen atmosphere.

In the case that the amount of the nickel (Ni) is 60 mol % or more, the primary sintering temperature may be 850° C. or more, preferably 850° C. to 1,000° C., and more preferably 900° C. to 950° C. The primary sintering may be performed for 5 hours to 20 hours, preferably 5 hours to 15 hours, and more preferably 5 hours to 12 hours. The primary sintering may be performed in an oxygen atmosphere or an air atmosphere, and may more preferably be performed in an oxygen atmosphere.

Since the positive electrode active material precursor, which has been in the form of a secondary particle in which primary particles are aggregated, becomes a single particle by the primary sintering, a primary sintered product of the NCM-based lithium composite transition metal oxide, as a single particle, may be formed.

A step of milling the primary sintered product after the primary sintering and before the secondary sintering may be further included. Specifically, the primary sintered product may be milled using a jet mill. An Fm-3m resistance portion, which is formed during the secondary sintering, may be formed on a surface of the final particle by performing the step of milling the primary sintered product. If milling is performed after performing the secondary sintering without the milling of the primary sintered product, the Fm-3m resistance portion may not be uniformly formed on the surface of the final particle.

Next, the primary sintered product is secondarily sintered at a sintering temperature, which is lower than the primary sintering temperature by a predetermined level, to form a lithium composite transition metal oxide. In a case in which the amount of the nickel (Ni) is less than 60 mol %, the secondary sintering is performed at a sintering temperature of 900° C. or less to form a lithium composite transition metal oxide. Also, in a case in which the amount of the nickel (Ni) is 60 mol % or more, the secondary sintering is performed at a sintering temperature of 800° C. or less to form a lithium composite transition metal oxide.

In the case that the amount of the nickel (Ni) is less than 60 mol %, the secondary sintering temperature may be 900° C. or less, preferably 600° C. to 900° C., and more preferably 700° C. to 900° C. The secondary sintering may be performed for 5 hours to 20 hours, preferably 5 hours to 15 hours, and more preferably 5 hours to 10 hours. The secondary sintering may be performed in an oxygen atmosphere or an air atmosphere, and may more preferably be performed in an oxygen atmosphere.

In the case that the amount of the nickel (Ni) is 60 mol % or more, the secondary sintering temperature may be 800° C. or less, preferably 500° C. to 800° C., and more preferably 600° C. to 800° C. The secondary sintering may be performed for 5 hours to 20 hours, preferably 5 hours to 15 hours, and more preferably 5 hours to 10 hours. The secondary sintering may be performed in an oxygen atmosphere or an air atmosphere, and may more preferably be performed in an oxygen atmosphere.

A resistance portion having a cubic rock-salt structure of space group Fm-3m may be formed on the surface of the particle by the secondary sintering.

The lithium composite transition metal oxide particle thus prepared is formed of a single particle and includes a core portion having a layered crystal structure of space group R-3m; and a resistance portion which is formed on the surface of the core portion and has a cubic rock-salt structure of space group Fm-3m. Also, the lithium composite transition metal oxide particle prepared by the primary over-sintering and the secondary sintering as described above may be composed of a primary particle having an average particle diameter ($D_{50}$) of 1 μm to 20 μm. The lithium composite transition metal oxide particle may be preferably composed of a primary particle having an average particle diameter ($D_{50}$) of 2 μm to 15 μm and may be more preferably composed of a primary particle having an average particle diameter ($D_{50}$) of 3 μm to 10 μm. Furthermore, the core portion of the lithium composite transition metal oxide particle prepared by the primary over-sintering and the secondary sintering as described above may have a crystallite size of 180 nm or more. The core portion may preferably have a crystallite size of 180 nm to 400 nm, and may more preferably have a crystallite size of 180 nm to 300 nm.

<Positive Electrode Active Material>

Next, the positive electrode active material of the present invention prepared as described above will be described.

The positive electrode active material for a secondary battery of the present invention is a lithium composite transition metal oxide including nickel (Ni), cobalt (Co), and manganese (Mn), wherein a particle of the lithium composite transition metal oxide includes a core portion and a resistance portion formed on a surface of the core portion and is composed of a single particle, wherein the core portion has a layered crystal structure of space group R-3m, and the resistance portion has a cubic rock-salt structure of space group Fm-3m.

The positive electrode active material of the present invention is an NCM-based lithium composite transition metal oxide including nickel (Ni), cobalt (Co), and manganese (Mn). The lithium composite transition metal oxide may be a high-Ni NCM-based lithium composite transition metal oxide in which an amount of the nickel (Ni) in a total amount of metals excluding lithium (Li) is 60 mol % or more, and may be a low-Ni NCM-based lithium composite transition metal oxide in which the amount of the nickel (Ni) is less than 60 mol %. With respect to the high-Ni NCM-based lithium composite transition metal oxide, the amount of the nickel (Ni) may be preferably 65 mol % or more, and may be more preferably 80 mol % or more. Since the amount of the nickel (Ni) in the total amount of the metals excluding lithium (Li) of the lithium composite transition metal oxide satisfies 60 mol % or more, higher capacity may be secured.

Specifically, the positive electrode active material according to an embodiment of the present invention may be an NCM-based lithium composite transition metal oxide represented by Formula 1 below.

$$\text{Li}_p\text{Ni}_{1-(x1+y1+z1)}\text{CO}_{x1}\text{Mn}_{y1}\text{M}^a{}_{z1}\text{O}_{2+\delta} \qquad \text{[Formula 1]}$$

In Formula 1, $M^a$ is at least one element selected from the group consisting of aluminum (Al), zirconium (Zr), titanium (Ti), magnesium (Mg), tantalum (Ta), niobium (Nb), molybdenum (Mo), chromium (Cr), barium (Ba), strontium (Sr), and calcium (Ca), and $1 \leq p \leq 1.3$, $0 < x1 \leq 0.5$, $0 < y1 \leq 0.5$, $0 \leq z1 \leq 0.1$, and $-0.1 \leq \delta \leq 1$.

In the lithium composite transition metal oxide of Formula 1, Li may be included in an amount corresponding to p, that is, $1 \leq p \leq 1.3$. When p is less than 1, capacity may be reduced, and, when p is greater than 1.3, milling is difficult due to an increase in strength of the sintered positive electrode active material and there may be an increase in amount of gas generated due to an increase in Li by-product. The Li may more preferably be included in an amount satisfying $1.0 \leq p \leq 1.1$, in consideration of balance between a capacity characteristics improvement effect of the positive electrode active material and sinterability during the preparation of the active material due to the control of the amount of the Li.

In the lithium composite transition metal oxide of Formula 1, Ni may be included in an amount corresponding to $1-(x1+y1+z1)$, for example, $0 < 1-(x1+y1+z1) \leq 0.99$. If the amount of the Ni in the lithium composite transition metal oxide of Formula 1 is 0.6 or more, since the amount of Ni, which is sufficient to contribute to charge and discharge, is secured, higher capacity may be achieved. The Ni may more preferably be included in an amount satisfying $0.531 \leq (x1+y1+z1) \leq 0.9$.

In the lithium composite transition metal oxide of Formula 1, Co may be included in an amount corresponding to $x1$, that is, $0<x1\leq0.5$. In a case in which the amount of the Co in the lithium composite transition metal oxide of Formula 1 is greater than 0.5, there is a concern that cost may increase. The Co may specifically be included in an amount satisfying $0.2\leq x1\leq0.4$ in consideration of a significant capacity characteristics improvement effect due to the inclusion of the Co.

In the lithium composite transition metal oxide of Formula 1, Mn may be included in an amount corresponding to $y1$, that is, $0<y1\leq0.5$. Mn may improve stability of the positive electrode active material, and, as a result, may improve stability of the battery. The Mn may specifically be included in an amount satisfying $0.05\leq y1\leq0.2$.

In the lithium composite transition metal oxide of Formula 1, $M^a$ may be a doping element included in a crystal structure of the lithium composite transition metal oxide, wherein the $M^a$ may be included in an amount corresponding to $z1$, that is, $0\leq z1\leq0.1$.

The lithium composite transition metal oxide particle of the present invention is not in the form of an aggregated secondary particle, but is composed of a single particle, that is, a primary particle. In the present invention, the expression 'primary particle' denotes a primary structure of the single particle, and the expression 'secondary particle' denotes an aggregate in which primary particles are aggregated by physical or chemical bonding between the primary particles without an intentional aggregation or assembly process of the primary particles constituting the secondary particle, that is, a secondary structure.

The lithium composite transition metal oxide particle may be composed of a primary particle having an average particle diameter ($D_{50}$) of 1 µm to 20 µm. The lithium composite transition metal oxide particle may preferably be composed of a primary particle having an average particle diameter ($D_{50}$) of 2 µm to 15 µm and may more preferably be composed of a primary particle having an average particle diameter ($D_{50}$) of 3 µm to 10 µm. Since the core portion is composed of the primary particle having an average particle diameter within the above range, that is, the single particle, particle strength may be increased to suppress particle breakage during rolling, improve rolling density, and reduce the amount of gas generated by a side reaction with an electrolyte solution due to decreases in specific surface area and lithium by-product.

In the present invention, the average particle diameter ($D_{50}$) may be defined as a particle diameter at a cumulative volume of 50% in a particle size distribution curve. The average particle diameter ($D_{50}$), for example, may be measured by using a laser diffraction method. For example, in a method of measuring the average particle diameter ($D_{50}$) of the positive electrode active material, after the particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 40 W, and the average particle diameter ($D_{50}$) at the cumulative volume of 50% may then be calculated by the measurement instrument.

Also, the lithium composite transition metal oxide particle includes a core portion and a resistance portion formed on the surface of the core portion, wherein the core portion of the lithium composite transition metal oxide particle has a layered crystal structure of space group R-3m, and the resistance portion has a cubic rock-salt structure of space group Fm-3m.

In the present invention, the crystal structures of the core portion and the resistance portion may be identified by high-resolution transmission electron microscope (HR-TEM) analysis.

The expression "layered crystal structure of space group R-3m" denotes a structure in which planes of atoms strongly bonded by covalent bonds or the like and densely arranged are overlapped in parallel by a weak binding force such as a van der Waals force. With respect to the lithium composite transition metal oxide having a layered crystal structure of space group R-3m, intercalation and deintercalation of lithium ions are possible because the lithium ions, transition metal ions, and oxygen ions are densely arranged, specifically, a metal oxide layer composed of transition metal and oxygen and an oxygen octahedral layer surrounding lithium are alternatingly arranged with each other, and a Coulomb repulsive force acts between the metal oxide layers, and ionic conductivity is high because the lithium ions diffuse along a two-dimensional plane. Thus, with respect to the positive electrode active material having a layered crystal structure of space group R-3m, since the lithium ions may quickly and smoothly move in the particle to facilitate the intercalation and deintercalation of the lithium ions, initial internal resistance of the battery may be reduced, and thus, discharge capacity and life characteristics may be further improved without worrying about the degradation of rate capability and initial capacity characteristics.

The expression "cubic rock-salt structure of space group Fm-3m" denotes a face-centered cubic structure in which a metal atom is coordinated by surrounding six oxygen atoms arranged in an octahedral form. A compound having the cubic rock-salt structure of space group Fm-3m has high structural stability, particularly, high structural stability at high temperature.

The core portion may have a crystallite size of 180 nm or more. The core portion may preferably have a crystallite size of 180 nm to 400 nm, for example, 180 nm to 300 nm. Since the core portion satisfying the above crystallite size according to an embodiment of the present invention is formed, the positive electrode active material may suppress the particle breakage caused by rolling and the life characteristics and stability may be improved.

In the present invention, the expression 'particle' denotes a granule with a size of a few tens of microns, and, when the particle is magnified and observed, the particle may be identified as 'grain' which has a crystal form with a size of a few hundreds of nanometers to a few microns. When the grain is further magnified, it is possible to identify a separated region having a form in which atoms form a lattice structure in a predetermined direction, wherein the region is referred to as a 'crystallite', and a size of the particle observed by X-ray diffraction (XRD) is defined as a size of the crystallite. With respect to a method of measuring the crystallite size, the crystallite size may be determined by peak broadening of XRD data and may be quantitatively calculated from the Scherrer equation.

The resistance portion formed on the surface of the core portion has a cubic rock-salt structure of space group Fm-3m. The resistance portion may be formed on a part or entirety of the surface of the core portion. In a case in which the resistance portion is formed on the part of the surface of the core portion, the resistance portion may be formed in an island shape.

Since the side reaction with the electrolyte solution is reduced by forming the resistance portion having a cubic rock-salt structure of space group Fm-3m on the surface of the core portion, the amount of the gas generated during cell operation may be reduced, the increase in resistance may be suppressed, and the thermal stability may be improved.

Since the positive electrode active material according to the embodiment of the present invention is composed of a single particle and includes the core portion having a layered crystal structure of space group R-3m and the resistance portion which is formed on the surface of the core portion and has a cubic rock-salt structure of space group Fm-3m, the specific surface area of the NCM-based positive electrode active material may be reduced, the particle strength may be improved, and the side with the electrolyte solution may be reduced. Thus, with respect to a lithium secondary battery using the NCM-based positive electrode active material of the present invention, the amount of the gas generated during cell operation may be reduced, the increase in resistance may be suppressed, and the thermal stability may be improved.

In a case in which the positive electrode active material according to the embodiment of the present invention having the core portion and the resistance portion is a low-Ni NCM-based positive electrode active material in which the amount of the nickel (Ni) in the total amount of metals excluding lithium (Li) is less than 60 mol %, the positive electrode active material may be formed by performing primary over-sintering at a sintering temperature of 980° C. or more and performing secondary sintering at a sintering temperature of 900° C. or less.

Also, with respect to a high-Ni NCM-based positive electrode active material in which the amount of the nickel (Ni) in the total amount of metals excluding lithium (Li) is 60 mol % or more, the positive electrode active material may be formed by performing primary over-sintering at a sintering temperature of 850° C. or more and performing secondary sintering at a sintering temperature of 800° C. or less.

With respect to the low-Ni NCM-based positive electrode active material in which the amount of the nickel (Ni) in the total amount of metals excluding lithium (Li) is less than 60 mol %, when the positive electrode active material according to the embodiment of the present invention is thermally analyzed by differential scanning calorimetry (DSC), a main peak with a maximum heat flow may be measured at 280° C. or more. The main peak may preferably be measured at 280° C. to 300° C. and may more preferably be measured at 283° C. to 300° C. Also, the maximum heat flow may be 8 W/g or less, preferably 7 W/g or less, and more preferably 6 W/g or less.

Furthermore, with respect to the high-Ni NCM-based positive electrode active material in which the amount of the nickel (Ni) in the total amount of metals excluding lithium (Li) is 60 mol % or more, a main peak with a maximum heat flow may be measured at 210° C. or more. The main peak may preferably be measured at 210° C. to 250° C. and may more preferably be measured at 213° C. to 250° C. Also, the maximum heat flow may be 15 W/g or less, preferably 13 W/g or less, and more preferably 12 W/g or less.

Positive Electrode and Secondary Battery

According to another embodiment of the present invention, provided are a positive electrode for a secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a r through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiCAF_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

In a 5 L batch-type reactor set at 60° C., $NiSO_4$, $CoSO_4$, and $MnSO_4$ were mixed in water in amounts such that a molar ratio of nickel:cobalt:manganese was 50:20:30 to prepare a precursor-forming solution with a concentration of 2.4 M.

1 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 10 ml of a 25% NaOH aqueous solution was added, and stirring was then performed at a speed of 1,200 rpm and a temperature of 60° C. to maintain a pH at 12.0.

Subsequently, a co-precipitation reaction was performed for 18 hours while adding the precursor-forming solution at a rate of 180 ml/hr together with a NaOH aqueous solution and a $NH_4OH$ aqueous solution to form particles of a nickel-cobalt-manganese-containing hydroxide $(Ni_{0.50}CO_{0.20}Mn_{0.30}(OH)_2)$. The hydroxide particles were separated, washed, and then dried in an oven at 120° C. to prepare a positive electrode active material precursor. The positive electrode active material precursor thus prepared was in the form of a secondary particle in which primary particles were aggregated.

The positive electrode active material precursor thus prepared and a lithium raw material, LiOH, were added to a Henschel mixer (700 L) such that a final molar ratio of Li/M(Ni, Co, Mn) was 1.02, and were mixed at a center speed of 300 rpm for 20 minutes. The mixed powder was put in an alumina crucible with a size of 330 mm×330 mm and primarily sintered at 1,010° C. for 10 hours under an oxygen ($O_2$) atmosphere to form a primary sintered product.

Thereafter, the primary sintered product was ground at a feeding pressure of 80 psi and a grinding pressure of 60 psi using a jet mill.

The ground primary sintered product was put in an alumina crucible with a size of 330 mm×330 mm and secondarily sintered at 850° C. for 5 hours under an oxygen ($O_2$) atmosphere to prepare a positive electrode active material.

Example 2

A positive electrode active material was prepared in the same manner as in Example 1 except that the primary sintering was performed at 980° C. for 10 hours.

Example 3

A positive electrode active material was prepared in the same manner as in Example 1 except that the secondary sintering was performed at 800° C. for 5 hours.

Example 4

A positive electrode active material was prepared in the same manner as in Example 1 except that a precursor was prepared such that a molar ratio of nickel:cobalt:manganese was 80:10:10, the primary sintering was performed at 930° C. for 10 hours, and the secondary sintering was performed at 750° C. for 5 hours.

Example 5

A positive electrode active material was prepared in the same manner as in Example 4 except that the primary sintering was performed at 900° C. for 10 hours.

Example 6

A positive electrode active material was prepared in the same manner as in Example 4 except that the secondary sintering was performed at 700° C. for 5 hours.

Comparative Example 1

A positive electrode active material was prepared in the same manner as in Example 1 except that the secondary sintering was not performed.

Comparative Example 2

A positive electrode active material was prepared in the same manner as in Example 1 except that the primary sintering was performed at 910° C. for 20 hours, and the secondary sintering was not performed.

Comparative Example 3

A positive electrode active material was prepared in the same manner as in Example 4 except that the secondary sintering was not performed.

Comparative Example 4

A positive electrode active material was prepared in the same manner as in Example 4 except that the primary sintering was performed at 810° C. for 20 hours, and the secondary sintering was not performed.

Experimental Example 1: Positive Electrode Active Material Observation

Images of the positive electrode active materials prepared in Examples 1 to 6 and Comparative Examples 1 to 4, which were magnified with a scanning electron microscope (SEM), are illustrated in FIGS. 1 to 10, and images of the positive electrode active materials observed with a transmission electron microscope (TEM) are illustrated in FIGS. 11 to 14.

Figure 8:
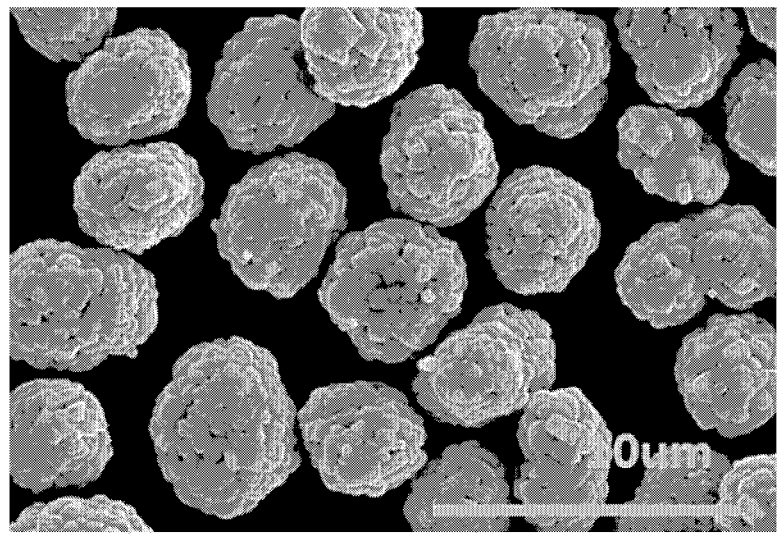
FIG. 8 is a magnified scanning electron microscope (SEM) image of a positive electrode active material prepared in Comparative Example 2.
Figure 9:
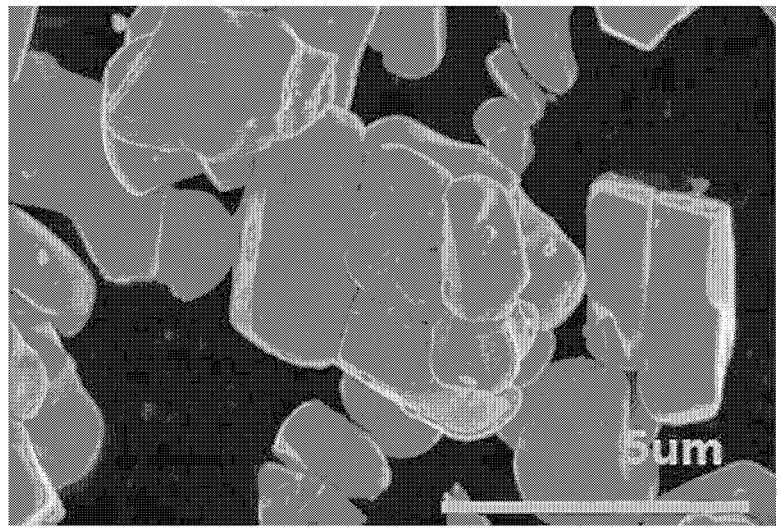
FIG. 9 is a magnified scanning electron microscope (SEM) image of a positive electrode active material prepared in Comparative Example 3.
Figure 10:
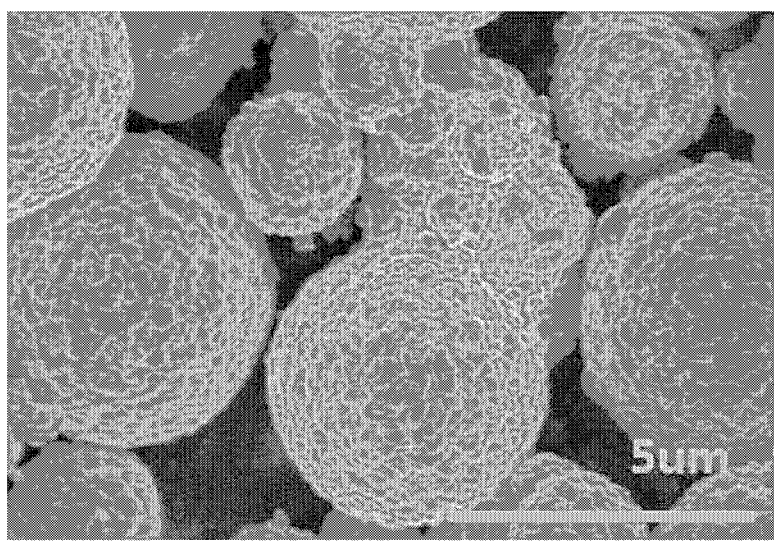
FIG. 10 is a magnified scanning electron microscope (SEM) image of a positive electrode active material prepared in Comparative Example 4.
Figure 11:
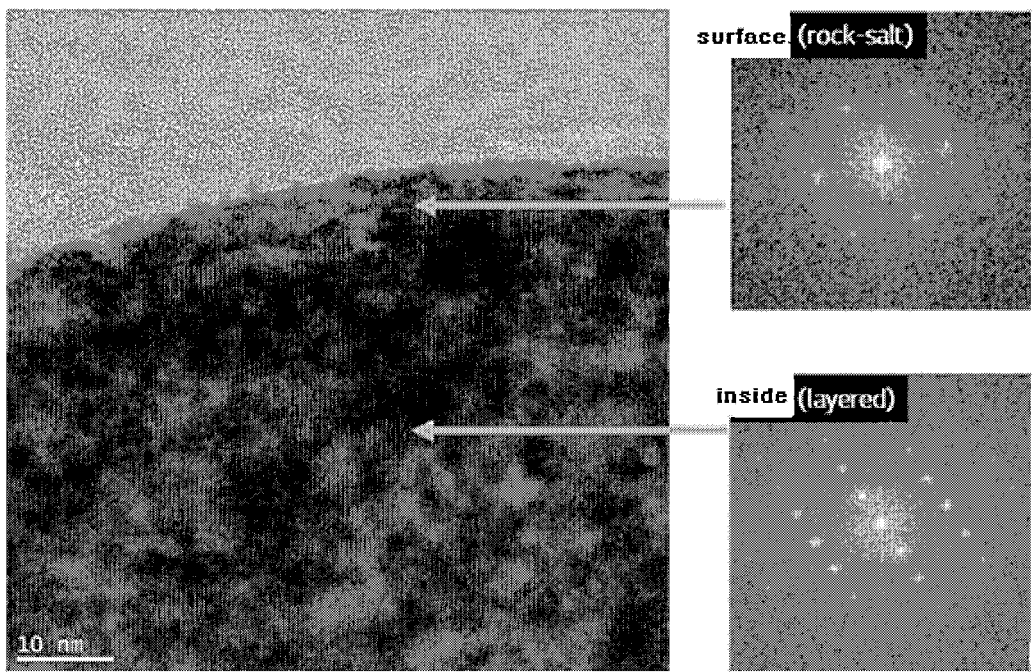
FIG. 11 is a transmission electron microscope (TEM) image of the positive electrode active material prepared in Example 1.
Figure 12:
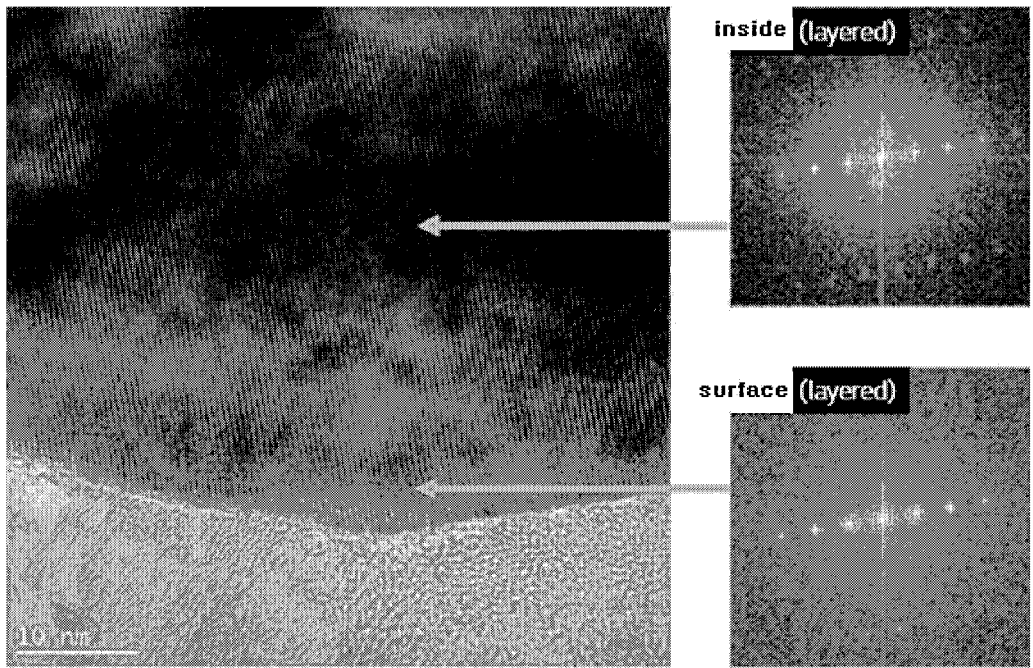
FIG. 12 is a transmission electron microscope (TEM) image of the positive electrode active material prepared in Comparative Example 1.
Figure 13:
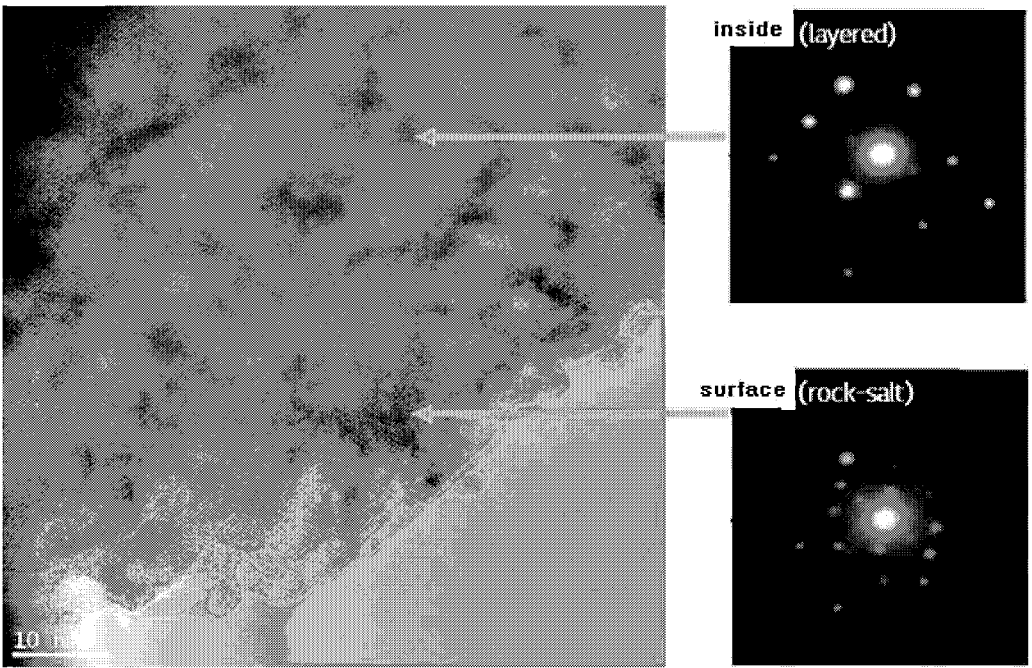
FIG. 13 is a transmission electron microscope (TEM) image of the positive electrode active material prepared in Example 4.
Figure 14:
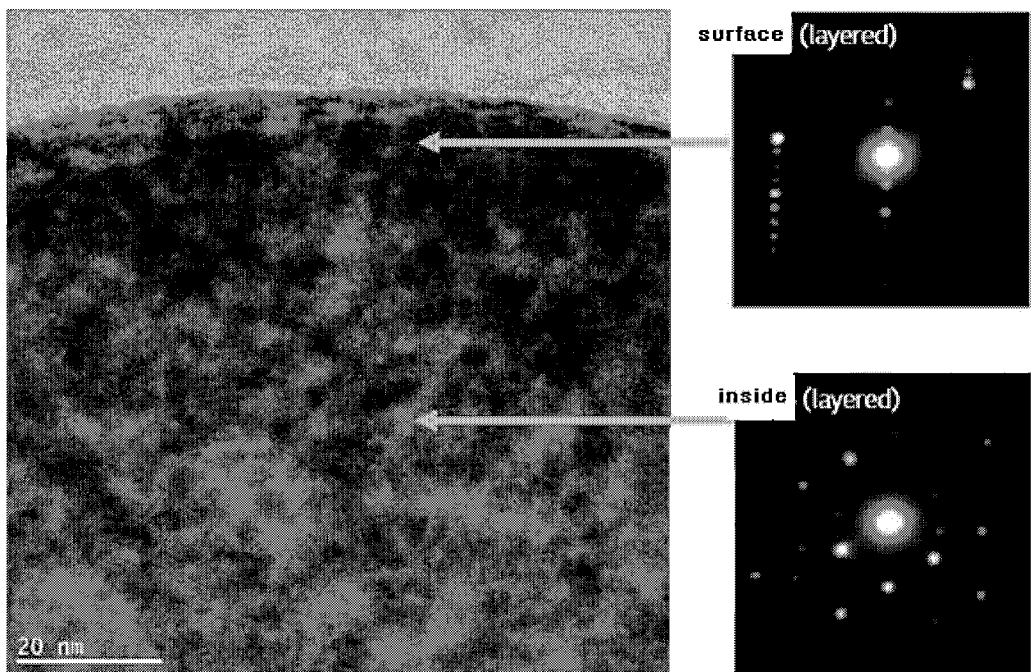
FIG. 14 is a transmission electron microscope (TEM) image of the positive electrode active material prepared in Comparative Example 3.

Referring to FIGS. 1 to 7 and 9, the positive electrode active materials prepared in Examples 1 to 6 of the present invention and Comparative Examples 1 and 3 formed a primary structure of a single particle, but, referring to FIGS. 8 and 10, it may be confirmed that the positive electrode active materials prepared in Comparative Examples 2 and 4 were in the form of a secondary particle in which primary particles were aggregated to each other.

Referring to FIGS. 11 to 14, with respect to the positive electrode active materials prepared in Examples 1 and 4 of the present invention, it may be confirmed that a resistance portion having a cubic rock-salt structure of space group Fm-3m was formed on the surface of a core portion having a layered crystal structure of space group R-3m, and, with respect to the positive electrode active materials prepared in Comparative Examples 1 and 3 in which the secondary sintering was not performed, a layered crystal structure of space group R-3m was identified in both core portion and surface.

Experimental Example 2: Crystallite Size

Crystallite sizes of the positive electrode active materials prepared in Examples 1 and 2 and Comparative Examples 1 and 2 were measured. The crystallite sizes were measured by XRD (Ultima IV) and their values were calculated.

TABLE 1

| | Crystallite size (nm) |
|---|---|
| Example 1 | 200 |
| Example 2 | 180 |
| Example 3 | 205 |
| Example 4 | 200 |
| Example 5 | 185 |
| Example 6 | 190 |
| Comparative Example 1 | 205 |
| Comparative Example 2 | 165 |
| Comparative Example 3 | 190 |
| Comparative Example 4 | 150 |

Referring to Table 1, the positive electrode active materials of Examples 1 to 6 and Comparative Examples 1 and 3, in which over-sintering was performed in the primary sintering, had a crystallite size of 180 nm or more. However, the positive electrode active materials of Comparative Examples 2 and 4, in which the primary sintering temperature was low, had a crystallite size of less than 180 nm.

Experimental Example 3: Thermal Stability Evaluation

In order to evaluate thermal stabilities of the positive electrode active materials prepared in Examples 1 to 6 and Comparative Examples 1 to 4, a heat flow according to the temperature was measured using a differential scanning calorimeter (SENSYS Evo by SETARAM Instrumentation).

Specifically, each of the positive electrode active materials prepared in Examples 1 to 6 and Comparative Examples 1 to 4, a carbon black conductive agent, and a PVdF binder were mixed in an N-methylpyrrolidone solvent at a weight ratio of 96:2:2 to prepare a positive electrode material mixture, and one surface of an aluminum current collector was coated with the positive electrode material mixture, dried at 100° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/ethylmethyl carbonate/diethyl carbonate (mixing volume ratio of EC/EMC/DEC=3/4/3).

Each lithium secondary battery half cell thus prepared was disassembled in a charged state, a state of charge (SOC) of 100%, to introduce the positive electrode and a new electrolyte solution into a cell for DSC measurement, and measurement was performed while increasing the temperature from room temperature to 400° C. at a rate of 10° C. per minute. The results thereof are presented in Table 2.

TABLE 2

| | DSC main peak (° C.) | Maximum heat flow (W/g) |
|---|---|---|
| Example 1 | 291 | 4 |
| Example 2 | 284 | 6 |
| Example 3 | 281 | 6 |
| Example 4 | 226 | 10 |
| Example 5 | 213 | 12 |

19

TABLE 2-continued

| | DSC main peak (° C.) | Maximum heat flow (W/g) |
|---|---|---|
| Example 6 | 221 | 10 |
| Comparative Example 1 | 280 | 10 |
| Comparative Example 2 | 270 | 23 |
| Comparative Example 3 | 215 | 30 |
| Comparative Example 4 | 210 | 70 |

Referring to Table 2, with respect to Examples 1 to 3 of the present invention, main peaks with a maximum heat flow appeared at relatively higher temperatures than those of Comparative Examples 1 and 2, and it may be confirmed that the maximum heat flows were significantly reduced. Also, with respect to Examples 4 to 6, main peaks with a maximum heat flow appeared at relatively higher temperatures than those of Comparative Examples 3 and 4, and it may be confirmed that the maximum heat flows were significantly reduced. Accordingly, it may be understood that thermal stabilities of Examples 1 to 6 were significantly improved in comparison to those of Comparative Examples 1 to 4.

Since the positive electrode active material prepared in Comparative Example 2, which had a secondary particle shape due to a difference in primary sintering conditions greatly influencing a single particle shape and Brunauer-Emmett-Teller (BET), had high reactivity, it may be confirmed that the temperature of the main peak was lower than that of Comparative Example 1 and the maximum heat flow was high. With respect to Comparative Example 1, since its primary sintering conditions were similar to those of Examples 1 to 3, its single particle shape and BET were controlled to levels similar to those of Examples 1 to 3, but it may be expected that a low main peak temperature and a high maximum heat flow were exhibited due to the absence of the surface Fm-3m resistance portion by the secondary sintering. Similarly, with respect to Comparative Examples 3 and 4, it may be confirmed that, with respect to Comparative Example 4, the main peak temperature was lower and the maximum heat flow was higher than that of Comparative Example 3 due to changes in single particle shape and BET caused by the difference in primary sintering conditions. With respect to Comparative Example 3, since its primary sintering conditions were similar to those of Examples 4 to 6, its single particle shape and BET were similarly controlled, but it may be expected that a lower main peak temperature and a higher maximum heat flow than those of Examples 4 to 6 were exhibited due to the absence of the surface Fm-3m resistance portion by the secondary sintering.

Experimental Example 4: Life Characteristics Evaluation

Each of the lithium secondary battery half cells prepared as in Experimental Example 3 by using each of the positive electrode active materials prepared in Examples 1 to 6 and Comparative Examples 1 to 4 was charged at 0.2 C to a voltage of 4.4 V (Examples 1 to 3, Comparative Examples 1 and 2) or 4.25 V (Examples 4 to 6, Comparative Examples 3 and 4) in a constant current/constant voltage (CCCV) mode at 25° C. (termination current of ¹⁄₂₀ C), and discharged at a constant current of 0.2 C to a voltage of 3.0 V to measure initial charge and initial discharge capacities. Thereafter, each half cell was charged at 0.7 C to a voltage of 4.4 V (Examples 1 to 3, Comparative Examples 1 and 2) or 4.25 V (Examples 4 to 6, Comparative Examples 3 and 4) in a CCCV mode, and discharged at a constant current of 0.5 C to a voltage of 3.0 V to measure capacity retention when 30 cycles of charge and discharge were performed and thus, life characteristics were evaluated. The results thereof are presented in Table 3.

TABLE 3

| | Initial discharge capacity (mAh/g) | Capacity retention (%) (@ 30$^{th}$ cycle) |
|---|---|---|
| Example 1 | 176 | 90 |
| Example 2 | 176 | 90 |
| Example 3 | 175 | 89 |
| Example 4 | 195 | 81 |
| Example 5 | 194 | 80 |
| Example 6 | 195 | 82 |
| Comparative Example 1 | 178 | 87 |
| Comparative Example 2 | 180 | 83 |
| Comparative Example 3 | 195 | 74 |
| Comparative Example 4 | 200 | 69 |

Referring to Table 3, with respect to the positive electrode active materials prepared in Examples 1 to 3, initial capacities were equivalent or somewhat inferior to those of Comparative Examples 1 and 2, but it may be confirmed that life characteristics were significantly improved. Also, with respect to the positive electrode active materials prepared in Examples 4 to 6, initial capacities were equivalent or somewhat inferior to those of Comparative Examples 3 and 4, but it may be confirmed that life characteristics were significantly improved.

Since the positive electrode active material prepared in Comparative Example 2, which had a secondary particle shape due to the difference in primary sintering conditions greatly influencing a single particle shape and BET, had large BET, resistance was low due to the large surface area, and thus, it may be confirmed that it exhibited higher discharge capacity than Comparative Example 1 and cycle characteristics were poorer due to a large reaction area. With respect to Comparative Example 1, since its primary sintering conditions were similar to those of Examples 1 to 3, its single particle shape and BET were controlled to levels similar to those of Examples 1 to 3, but, since resistance was low due to the absence of the surface Fm-3m resistance portion by the secondary sintering, high discharge capacity was exhibited and surface reactivity was relatively increased, and thus, it may be expected that poor cycle retention characteristics were exhibited. Similarly, with respect to Comparative Examples 3 and 4, it may be confirmed that, with respect to Comparative Example 4, discharge capacity was higher and cycle characteristics were poorer than those of Comparative Example 3 due to the changes in single particle shape and BET caused by the difference in primary sintering conditions. With respect to Comparative Example 3, since its primary sintering conditions were similar to those of Examples 4 to 6, its single particle shape and BET were similarly controlled, but it may be expected that higher discharge capacity and higher surface reactivity than those of Examples 4 to 6 were exhibited due to the absence of the surface Fm-3m resistance portion by the secondary sintering.

The invention claimed is:

1. A positive electrode active material for a secondary battery, the positive electrode active material comprising a lithium composite transition metal oxide
  wherein a particle of the lithium composite transition metal oxide comprises a core portion and a resistance portion formed on a surface of the core portion, and is composed of a single particle, wherein the core portion has a layered crystal structure of space group R-3m, and the resistance portion has a cubic rock-salt structure of space group Fm-3m, wherein the core portion and resistance portion are the lithium composite transition metal oxide including nickel (Ni), cobalt (Co), and manganese (Mn), and the lithium composite transition metal oxide in which an amount of the nickel (Ni) in a total amount of metals excluding lithium (Li) is 60 mol % or more, and wherein the core portion and the resistance portion are composed of the same metallic elements.

2. The positive electrode active material for a secondary battery of claim 1, wherein the resistance portion is formed on a part or entirety of the surface of the core portion.

3. The positive electrode active material for a secondary battery of claim 1, wherein the core portion has a crystallite size of 180 nm to 400 nm.

4. The positive electrode active material for a secondary battery of claim 1, wherein a main peak with a maximum heat flow is measured at 210° C. or more, and the maximum heat flow is 15 W/g or less when the positive electrode active material is thermally analyzed by differential scanning calorimetry (DSC).

5. The positive electrode active material for a secondary battery of claim 1, wherein a main peak with a maximum heat flow is measured at 210° C. to 250° C., and the maximum heat flow is 15 W/g or less when the positive electrode active material is thermally analyzed by differential scanning calorimetry (DSC).

6. The positive electrode active material for a secondary battery of claim 1, wherein the lithium composite transition metal oxide particle is composed of a primary particle having an average particle diameter (D50) of 3 μm to 10 μm.

7. A positive electrode for a secondary battery, the positive electrode comprising the positive electrode active material of claim 1.

8. A lithium secondary battery comprising the positive electrode of claim 7.

* * * * *